No. 789,918. Patented May 16, 1905.

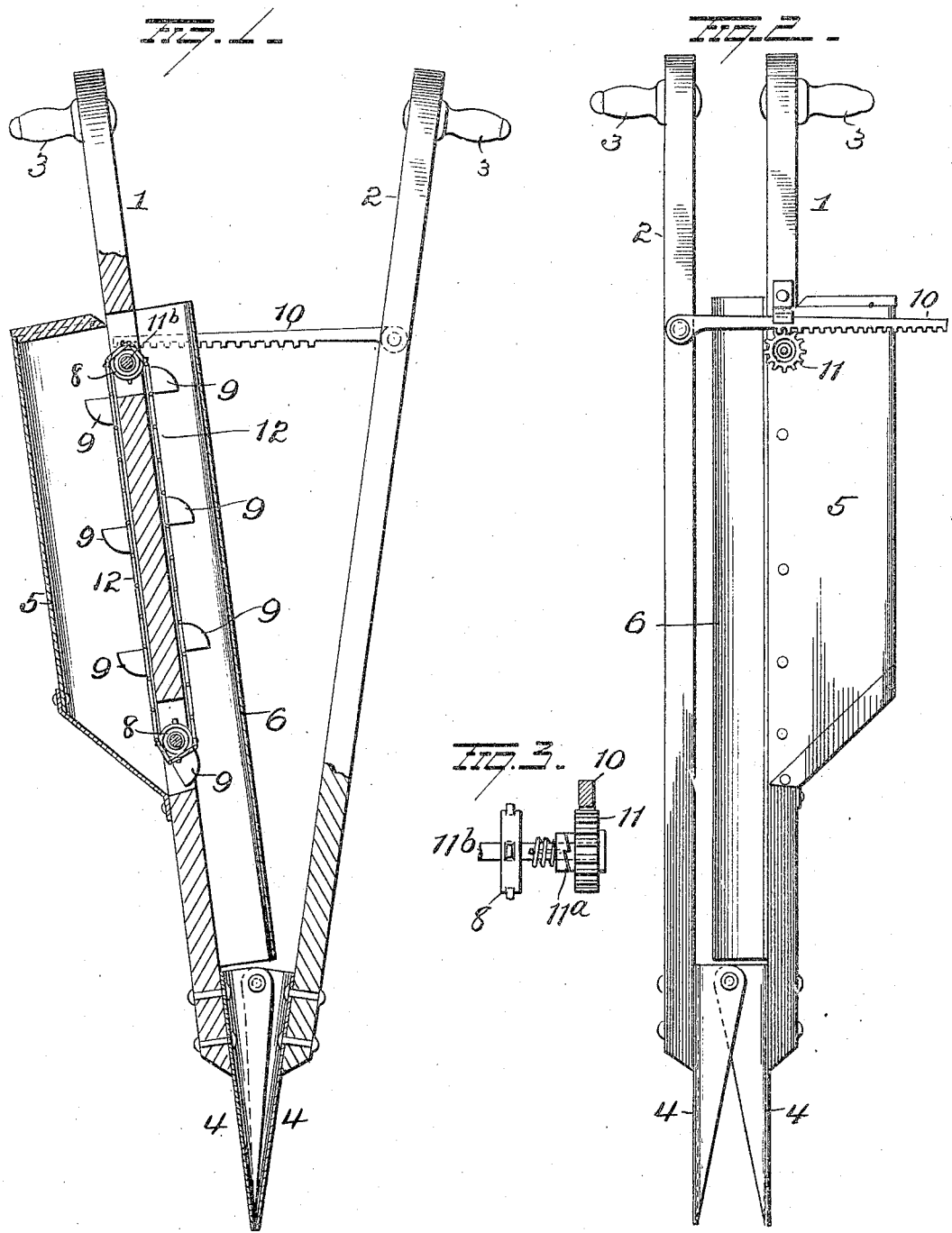

UNITED STATES PATENT OFFICE.

ARTHUR C. KENT, OF JANESVILLE, WISCONSIN.

HAND-PLANTER.

SPECIFICATION forming part of Letters Patent No. 789,918, dated May 16, 1905.

Application filed January 28, 1905. Serial No. 243,036.

*To all whom it may concern:*

Be it known that I, ARTHUR C. KENT, a resident of Janesville, in the county of Rock and State of Wisconsin, have invented certain new and useful Improvements in Hand-Planters; and I do hereby declare the following to be a full, clear, and exact description of the invention, such as will enable others skilled in the art to which it appertains to make and use the same.

My invention relates to an improved hand-planter, and more particularly for planting potatoes, the object of the invention being to provide improved means for removing a potato or number of potatoes from a receptacle and dropping them into the ground prepared to receive the same; and the invention consists in certain novel features of construction and combinations and arrangements of parts, as will be more fully hereinafter described, and pointed out in the claims.

In the accompanying drawings, Figure 1 is a view in vertical section, illustrating my improvements in position to enter the ground. Fig. 2 is a side view showing the device in position to drop a potato into the ground, and Fig. 3 is a detail view.

1 and 2 represent handles having handholds 3 at their upper ends, and triangular blades 4 are secured to the lower ends of the handles and pivoted together, as shown, so that when the handles are swung apart the blades 4 will form a hollow wedge-like sharp end easily forced into the ground, and when the handles are moved toward each other the blades will spread the ground and hold it thus spread while the potato moves down between the blades into the ground.

To the handle 1 a receptacle 5 for potatoes to be planted is secured, and a tube 6 is also secured to this handle 1 and is adapted to direct the potatoes therefrom down to and between the blades at the lower end of the handles.

Sprocket-wheels 8 are located on short shafts secured to handle 1 near the upper and lower ends of receptacle 5, and an endless chain 12 is mounted on said sprocket-wheels and is provided at regular intervals with cups or buckets 9, which are adapted to enter an opening in the lower end of the receptacle and pass out through an opening near the top, the cups or buckets taking potatoes from the receptacle 5 and dropping them into tube 6, down which they fall into the hollow wedge-like formation of the blades. This chain 12 is operated by a rack-bar 10, pivoted at one end to handle 2, and the teeth on its lower edge engage a gear-wheel 11, secured by a spring-clutch $11^a$ to the shaft $11^b$, on which the upper sprocket-wheel 8 is secured, so that when the handles are swung toward each other the gear-wheel 11 will turn without turning the sprocket-wheel; but when the handles are swung apart the rack will turn the gear-wheel and move chain 12 far enough to compel two cups or buckets 9 to deposit their contents into tube 6.

The operation of my improvements is as follows: With the parts as shown in Fig. 1 a potato or potatoes are in the wedge-like blades, which are forced into the ground. The handles are then moved toward each other to the position shown in Fig. 2, which operation separates the blades 4 and drops the potato into the ground spread to receive the same, and such movement of the handles also causes the gear-wheel 11 to turn without turning the sprocket. The planter is then removed from the ground and the handles again separated, the rack-bar 10 turning gear-wheel 11 and upper sprocket-wheel 8, which moves chain 12 and causes a bucket or cup to drop its contents into tube 6, down which they fall into the hollow wedge-shaped blades, when the operation of planting above described is repeated.

A great many slight changes might be made in the general form and arrangement of the parts described without departing from my invention, and hence I do not wish to restrict myself to the precise details set forth, but consider myself at liberty to make such slight changes and alterations as fairly fall within the spirit and scope of my invention.

Having fully described my invention, what I claim as new, and desire to secure by Letters Patent, is—

1. A potato-planter comprising two members pivotally connected together near their lower ends and a receptacle carried by one of said members, of an endless conveyer having buckets to move upwardly through the receptacle and downwardly between said members, and means for operating said conveyer upon the separation of the upper ends of the pivoted members.

2. In a device of the character described, the combination of two handles, blades at the end of the handles hinged together, a receptacle secured to one handle, a bucket conveyer to remove articles therefrom, and means connected with the other handle for operating said bucket conveyer.

3. In a device of the character described, the combination of two handles, blades at the ends of the handles hinged together, a receptacle secured to one handle, a bucket conveyer to remove articles from the receptacle and drop the same down to the blades, and a rack-bar secured to one handle and adapted to move the bucket conveyer when the handles are separated.

4. In a device of the character described, the combination of two handles, blades at the ends of the handles hinged together, a receptacle secured to one handle, a tube secured to the handle and adapted to direct potatoes therefrom to and between the blades, a bucket conveyer adapted to remove potatoes from the receptacle and drop them into the tube, a gear-wheel for driving said bucket conveyer and rack-bar secured to the other handle and adapted to turn the gear-wheel when the handles are separated.

5. In a device of the character described, the combination of two handles, blades at the ends of the handles hinged together, a receptacle secured to one handle, a tube secured to the same handle and directing the potatoes therefrom to and between the blades, sprocket-wheels carried by the handle to which the receptacle is secured, an endless chain around the sprocket-wheels, buckets on said chain adapted to remove potatoes from the receptacle and drop them into the tube, a gear-wheel a spring-clutch securing the same beside one of said sprocket-wheels, and a rack-bar pivotally secured to the other handle and adapted to turn the gear-wheel only when the handles are separated.

In testimony whereof I have signed this specification in the presence of two subscribing witnesses.

ARTHUR C. KENT.

Witnesses:
S. B. SMITH,
JOHN G. REXFORD.